United States Patent [19]

Fernandez et al.

[11] Patent Number: 5,539,299
[45] Date of Patent: Jul. 23, 1996

[54] PROTECTION SWITCH FOR A BATTERY POWERED DEVICE

[75] Inventors: Jose M. Fernandez; Scott M. Garrett, both of Lawrenceville; Vernon Meadows, Lilburn, all of Ga.

[73] Assignee: Motorola Inc., Schaumburg, Ill.

[21] Appl. No.: 332,166

[22] Filed: Oct. 31, 1994

[51] Int. Cl.$^6$ .................................................. H02J 7/06
[52] U.S. Cl. ................................................ 320/39; 320/5
[58] Field of Search ........................... 320/5, 8, 39, 2, 320/13, 14, 49; 307/66

[56] References Cited

U.S. PATENT DOCUMENTS

| | | | |
|---|---|---|---|
| 4,291,266 | 9/1981 | Portmann | 320/2 |
| 5,039,928 | 8/1991 | Nishi et al. | 320/2 |
| 5,371,456 | 12/1994 | Brainard | 320/31 |
| 5,402,056 | 3/1995 | Ketterling | 320/6 |
| 5,471,128 | 11/1995 | Patino et al. | 320/13 |
| 5,477,124 | 12/1995 | Tamai | 320/13 |

Primary Examiner—Peter S. Wong
Assistant Examiner—Patrick B. Law
Attorney, Agent, or Firm—Kenneth M. Massaroni; Scott M. Garrett

[57] ABSTRACT

A battery pack 12 for powering a device 14 sensitive to input voltage contains a protection switch 28 and a control circuit 26. When the battery pack 12 is charged by a charger 10 and the voltage of the battery pack approaches the maximum safe level of the device 14, the control circuit 26 causes the protection switch 28 to electrically switch open to protect the device 14 from excessive voltage potentially output by the charger. Where the cells 16 are lithium ion cells or a type having a maximum safe voltage, a safety switch 49 is included to interrupt charge current 52 through the cells 16. The safety switch 49 is delayed by resistor/capacitor network 51, 53 so that it switches after the protection switch 28. The safety switch 49 includes a diode 58 to allow the device 14 to remain powered while the safety switch is blocking charge current. Further, diodes 40 and 42 are required to eliminate measurement error of the control circuit 26 if the battery pack 12 is charged through the device contacts 20 and 24.

26 Claims, 4 Drawing Sheets

PROTECTION SWITCH FOR A BATTERY POWERED DEVICE

TECHNICAL FIELD

This invention relates in general to the field of rechargeable batteries, and more particularly to battery overvoltage protection circuits for rechargeable batteries.

BACKGROUND OF THE INVENTION

Complex electronic devices such as two way radios, cellular telephones, and computers are increasingly becoming portable as electronics are integrated into smaller, more efficient embodiments. Concurrently, there has been an increase in demand for quality battery systems to power the portable devices. For devices that have a high power demand, such as cellular phones and portable computers, rechargeable battery systems, particularly nickel-cadmium and nickel metal hydride systems, are the most economical choice. However, the use of batteries has presented designers of such devices with an interesting challenge; without the benefit of a regulated power supply, the device must operate over an input voltage range, rather than at one particular voltage. Additionally, the battery voltage is continuously changing as different subsystems of the device turn on and off. The problem, then, is to get the device to operate consistently while the bias voltage of the electronics is continuously changing.

Certainly the means and knowledge exist to regulate battery voltage, either in the device or in the battery itself. Integrated linear voltage regulators that transform the raw battery voltage into a stable voltage for the device are available. Linear regulators, however, in light of the fact that operation time is a critical market feature, are prohibitively inefficient for all but very low current sub-systems of the device. Switched mode regulators can provide a more efficient means of regulating battery voltage, but cost and complexity also prohibit the use of such means to low current sub-systems. Therefore, the designer of portable electronic devices is left to contend with a battery voltage that may change as much as 100% from a fully discharged state to a peak voltage while being charged.

Since recharging may take an hour or more, it is advantageous to allow the device to operate while the battery is being recharged. Consequently, the device is exposed to the charger voltage. As mentioned previously, the peak voltage necessary for optimum charging can be quite high. The solutions arrived at to allow the device to operate efficiently over the operating voltage range of the battery are such that the device may be irreversibly damaged if peak charger voltage is applied. This is particularly true in hand held communications devices where the radio frequency power amplifier is typically connected directly across the raw battery voltage. Knowledgeable battery system designers would avoid this scenario by limiting the charger voltage to protect the device, sacrificing charging time as a compromise. However, third party manufacturers of battery chargers would likely not be aware of such limitations, and would make and sell chargers that could damage the device. Should this occur, the user would perceive that the device is defective, unaware that the charger caused the problem.

Another instance where the device would be exposed to excessive charger voltages is emerging as a result of the use of lithium-ion based batteries. Batteries based on such cells provide a significant advantage over nickel based systems in energy density, and afford the user more operation time, less weight, or a combination of both. However, these cells are sensitive to voltage, and, for safety reasons, must not be charged above a certain safety threshold voltage. To insure safety is maintained, it is necessary to provide a safety switch in series with the cells to interrupt a charge current, should it become necessary. The safety switch is controlled by a circuit responsive to cell voltage and activates the safety switch when the cell voltage reaches the safety threshold voltage. In a charger designed for lithium ion batteries, this would be a rare occurrence. However, given the fact that many customers would be unwilling to buy a new charger just to use lithium ion batteries, it would be advantageous if a lithium ion battery were designed in such a way that it could be charged in existing nickel-based system chargers. The safety switch of a lithium ion battery charged in a nickel-based system charger would be switched off every recharge cycle because the safety threshold voltage of a lithium ion battery is roughly two thirds of the voltage nickel batteries for the same applications can achieve during charging. When the safety switch switches off, a nickel-based system charger will raise its output voltage in an attempt to maintain constant current regulation. Since the cells and safety switch form a series structure in parallel with the device, the maximum charger voltage would be applied to the device that the battery is powering.

Therefore there exists a need in both nickel-based battery systems, and more particularly lithium ion batteries, to protect the associated device from excessive voltages produced by a charger when the battery is being recharged. Such means should reside in the battery pack so that the battery may be used in any charger.

DETAILED DESCRIPTION OF THE PREFERRED EMBODIMENT

Figure 1:
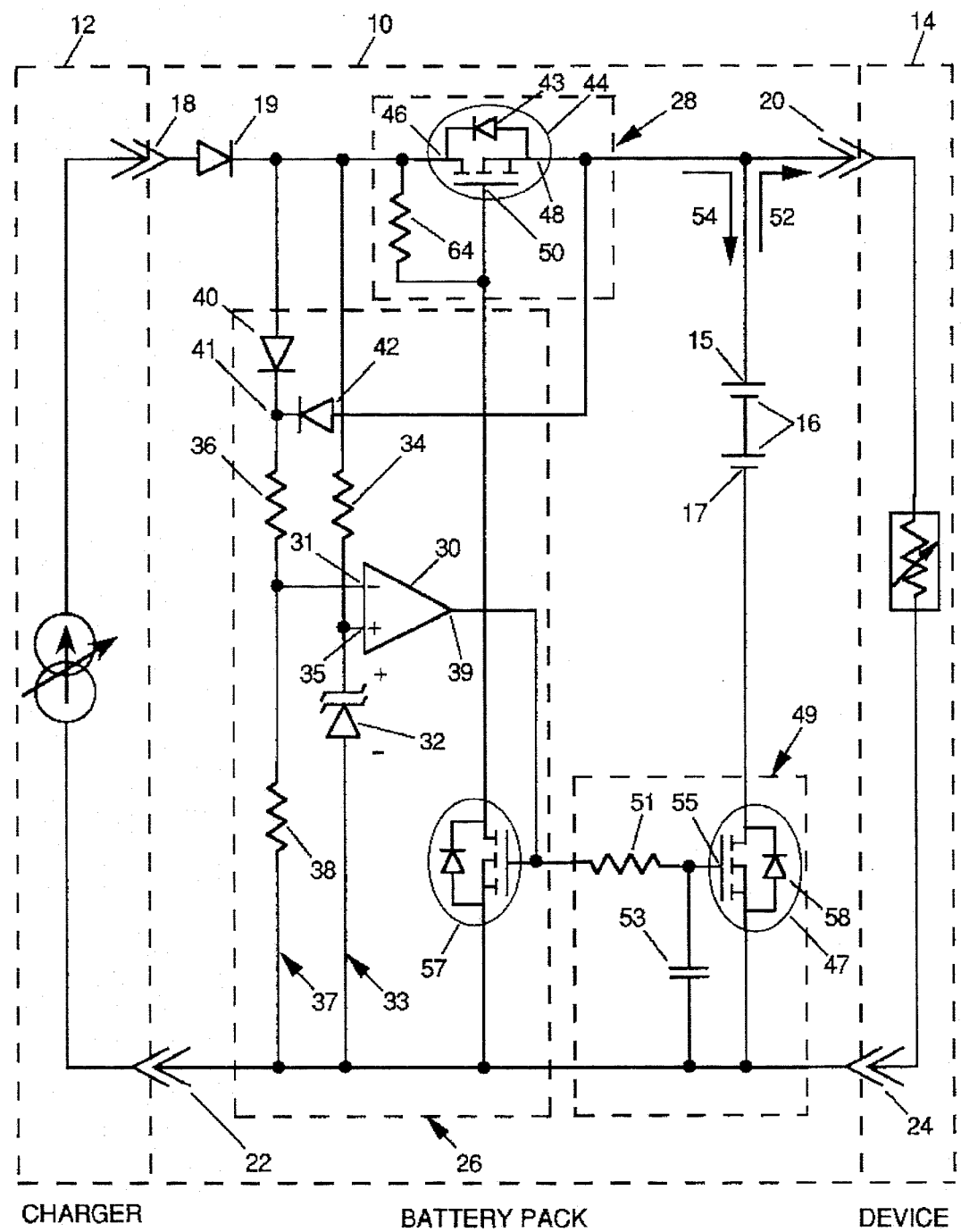
FIG. 1 is a schematic diagram of a battery pack, including an overvoltage protection circuit, in accordance with the invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, where there is illustrated therein a battery pack 10, a charger 12, and a device to be powered 14. The battery pack 10 is comprised of at least one cell 16, a protection switch 28, a control circuit 26 responsive to a battery voltage and a charger voltage, and where the battery cells 16 are of a lithium ion type, a safety switch 49. Discharge current to power the device flows from the cells 16 in the direction of arrow 52 through positive device contact 20 and returns through negative device contact 24. The cells 16 are recharged by the charger 12 when current flows from the charger in the direction of arrow 54 through positive charger contact 18 and returns to the charger through negative charger contact 22. Either of the charger contacts 18 or 22 may include a blocking device such as a diode 19 to allow current to flow in the charging direction only, so as to prevent discharging the cells through the charger contacts.

The protection switch 28 is comprised of a P-channel enhancement mode MOSFET 44, having a source 46, drain 48, and gate 50; the source 46 is connected to the positive charger contact 18, the drain 48 is connected to the positive terminal 15 of the battery cells 16, and the gate 50 is connected to an output of the control circuit 26 having a comparator output; that is, the output is switched between a high voltage level and a low voltage level. When the protection switch 28 is allowing current into the battery pack 10 the output of the control circuit 26 pulls current through pull up resistor 64 producing a voltage and biasing the MOSFET 44 to its lowest resistance state, referred to as being "on". When the control circuit 26 activates the protection switch 28, current stops flowing to the control circuit 26 through the pull up resistor 64 and into the gate 50 of the MOSFET 44 thereby removing bias from the MOSFET 44 causing it to become highly resistive, referred to as being "off". The effect is as if electrical contact had been broken and thus current and charger voltage is prevented from being applied to the battery cells 16 and the device 14.

In embodiments using lithium ion cells as battery cells 16, the safety switch 49 is comprised of a N-channel enhancement mode MOSFET 47 and is located in series with the battery cells 16 between the negative terminal 17 of the battery cells and the negative contacts 22 and 24. The gate 55 of the MOSFET 47 is connected to an output of the control circuit 26 through a delay circuit formed by resistor 51 and capacitor 53 such that the MOSFET 47 is on or off shortly after the protection switch 28 switches to the same corresponding state. The advantage of using a MOSFET as a safety switch 49 is it still allows the device 14 to operate by means of an inherent diode 58. This inherent diode 58 is a by-product of the manufacture of MOSFETs and is a well known feature of such devices. Discharge current will flow through the diode 58 even when the MOSFET 47 is off. During the time the switch 49 is off, the charger 10 tries to continue charging by raising its output voltage. If the protection switch 28 was not present, the device 14 could be damaged.

The control circuit 26 is comprised of an op-amp configured as a comparator 30, having an inverting input 31, a non-inverting input 35 and an output 39; a voltage reference leg 33 for providing a stable voltage to the non-inverting input 35 of the op-amp; and a divider leg 37 for providing the inverting input 31 of the op-amp with a voltage proportional to the charger voltage. The voltage reference leg 33 is comprised of a voltage reference 32 connected between the non-inverting input 35 of the op-amp and the negative charger contact 22, and voltage reference bias resistor 34 connected between the non-inverting input 35 of the op-amp and the positive charger contact 18. Although shown here connected to the positive charger contact 18, the voltage reference bias resistor 34 could be connected to any sufficiently positive voltage so long as enough current flows through it to bias the voltage reference 32 to produce a stable voltage.

The divider leg 37 is comprised of a first resistor 38 connected between the negative charger contact 22 and the inverting input 31 of the op-amp, a second resistor 36 connected between the inverting input 31 of the op-amp, and to the common node 41 of the cathodes of a pair of opposing diodes 40 and 42, connected in a straddling configuration across the protection switch 28. The anode of diode 40 is connected to the source 46 of the protection switch, and the anode of diode 42 is connected to the drain 48 of the protection switch. The output 39 of the op-amp provides a first comparator output and is connected to delay resistor 51 of the safety switch 49, and to a drive transistor 57. The drive transistor 57 provides a second comparator output to control the protection switch 28, and is preferably a N-channel MOSFET but could just as effectively be a NPN type bipolar transistor.

The straddling diodes 40 and 42 are used in conjunction with battery packs where safety switch 49 is included, and the battery cells 16 are lithium ion or another type having a maximum charge voltage. In a nickel-based battery system, resistor 36 could be connected to the source 46 of the protection switch instead of diode 40. Since there are chargers that charge the battery through the device contacts 20, 24, a lithium ion battery charged by such a charger must interrupt the charge current when the battery cells 16 reach the safety threshold voltage. If the diode 42 were not present, and resistor 36 were connected to the source 46 of protection switch MOSFET 44, if the protection switch 28 turns off, voltage is still applied to the divider leg 37 through the inherent diode 43 of the protection switch MOSFET 44. This would result in a lowering of the voltage applied to the inverting input 31 of the op-amp due to the forward bias voltage error of the inherent diode 43. The control circuit 26 would then switch on all switches again and the cycle would be repeated, causing the circuit to oscillate between on and off. With diodes 40 and 42 placed as shown, this condition is eliminated since voltage is applied through either diode with the same error, namely the forward bias voltage of the diodes. If the battery is charged through the charger contacts 18 and 22, then when the protection switch 28 is switched off, the charger contacts 18 and 22 will provide a higher voltage when the charger 12 attempts to continue charging. If the battery is charged through the device contacts 20 and 24, then when the safety switch 49 is switched off, the voltage from the device contacts 20 and 24 is applied to the divider leg 37 with the same error as if from the charger contacts 18 and 22.

To illustrate how the battery pack operates, and referring to FIG. 1, assume that the voltage across the battery cells 16 is less than the critical voltage. In nickel-based systems the critical voltage is the maximum voltage the device can withstand without damage. In lithium ion based systems the critical voltage is the safety threshold voltage of the cells, roughly 4.3 volts per cell. The divider resistors 38 and 36 are chosen such that while the battery voltage is below the critical value, the voltage provided to the inverting input 31 of the op-amp is less than the voltage of the voltage reference 32 provided to the non-inverting input 35 of the op-amp. As a result, the output 39 of the op-amp is at a high voltage, as defined previously. This causes the protection switch 28 to be on, and if in a lithium ion based battery, the safety switch 49 will also be on. During this time, since all switches are on, the voltage applied to the cells 16 by the charger 12 is the same as that applied to the device 14.

If the battery/charger voltage reaches the critical voltage, the values of the divider leg 37 resistors 36 and 38 are such that the voltage at the inverting input 31 of the op-amp just exceeds that provided by the reference voltage 32 to the non-inverting input 35 of the op-amp. As a result, the op-amp output 39 switches to a very low voltage, referred to as "low", and all switches are turned off. In the case of a lithium ion based battery, the safety switch 49 turns off after the protection switch 28 turns off. With the protection switch 28 off, the voltage across charger contacts 18 and 20 rises to the maximum output voltage of the charger 12, and is applied to the divider resistors 36 and 38 through diode 40, causing the op-amp-output 39 to stay low and keep all switches off.

Figure 2:
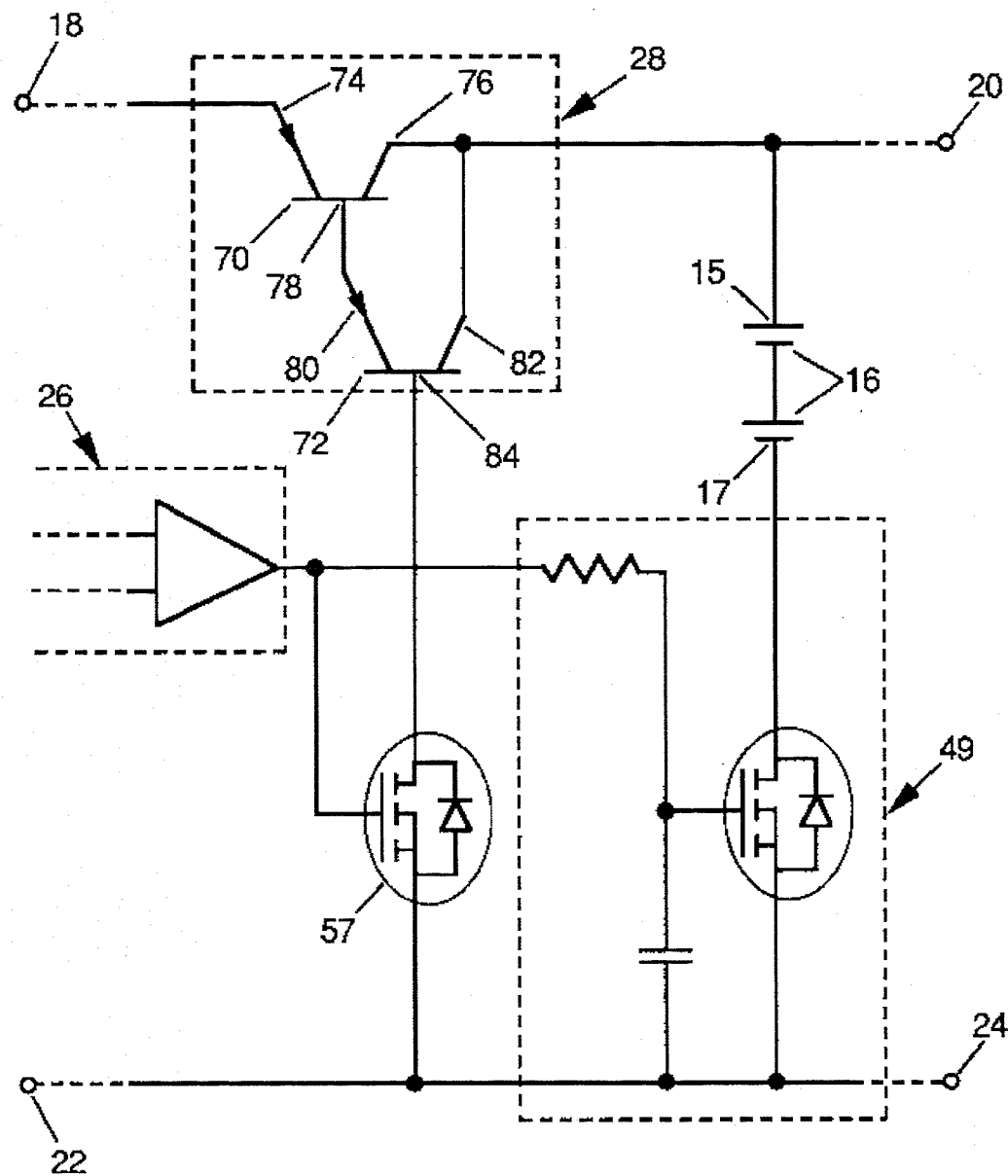
FIG. 2 is a schematic circuit diagram showing a first alternative implementation of the protection circuit.

Referring now to FIG. 2, there is illustrated therein a first alternative embodiment of the battery pack 10 illustrated in FIG. 1. In this embodiment, the protection switch 28 includes at least one bipolar transistor and preferably two transistors, shown here as transistors 70 and 72, instead of the P-channel enhancement mode MOSFET 44 of FIG. 1. The emitter 74 of bipolar transistor 70 is connected to positive charger contact 18, while collector 76 is connected to battery cells 16 and positive device contact 20. Base 78 of bipolar transistor 70 is connected to the emitter 80 of bipolar transistor 72. The collector 82 of transistor 72 is connected to the collector of transistor 70. This arrangement of two bipolar transistor of the same polarity, that is, PNP or NPN, is known in the art as a "darlington configuration". In this configuration, the effective transistor has an emitter 74, a collector 76, and a base 84. Base 84 of the effective transistor is connected to drive transistor 57. It may be appreciated that the embodiment of FIG. 2 does not require the pull up resistor 64 of FIG. 1.

In FIGS. 1 and 2, the protection switch 28 is electrically coupled between contacts 18 and 20, which define the most electrically positive side of the battery pack 10. This line is also known as the "high side". Current from charger 12 enters the battery pack 10 first via the high side line to the cells 16 returning to the charger 12 by the line defined by contacts 22 and 24. This second line is the least electrically positive, and is known as the "low side". Accordingly, the embodiments of FIGS. 1 and 2 are arranged in a high side configuration.

Figure 3:
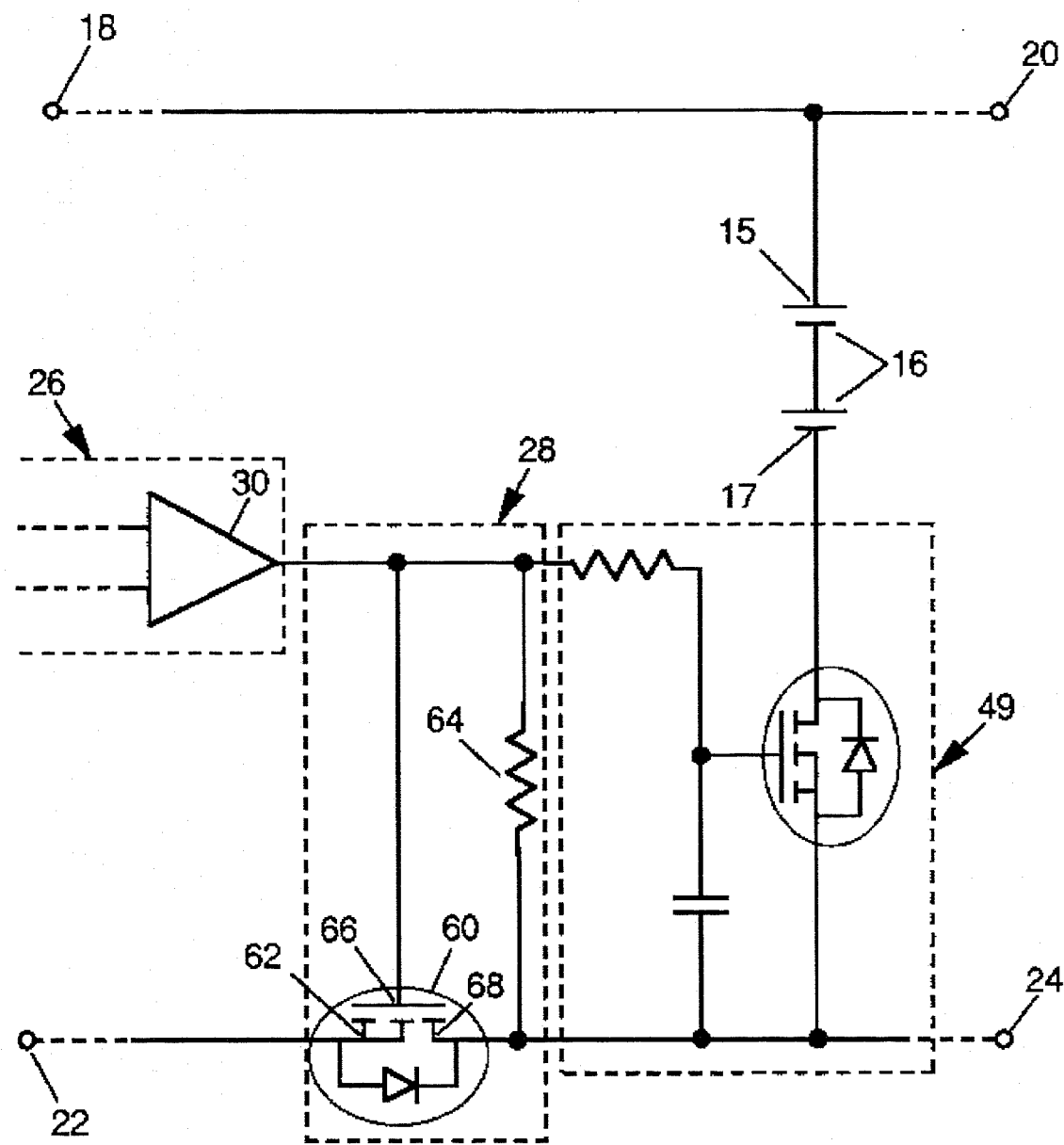
FIG. 3 is a schematic circuit diagram showing a second alternative implementation of the protection circuit.
Figure 4:
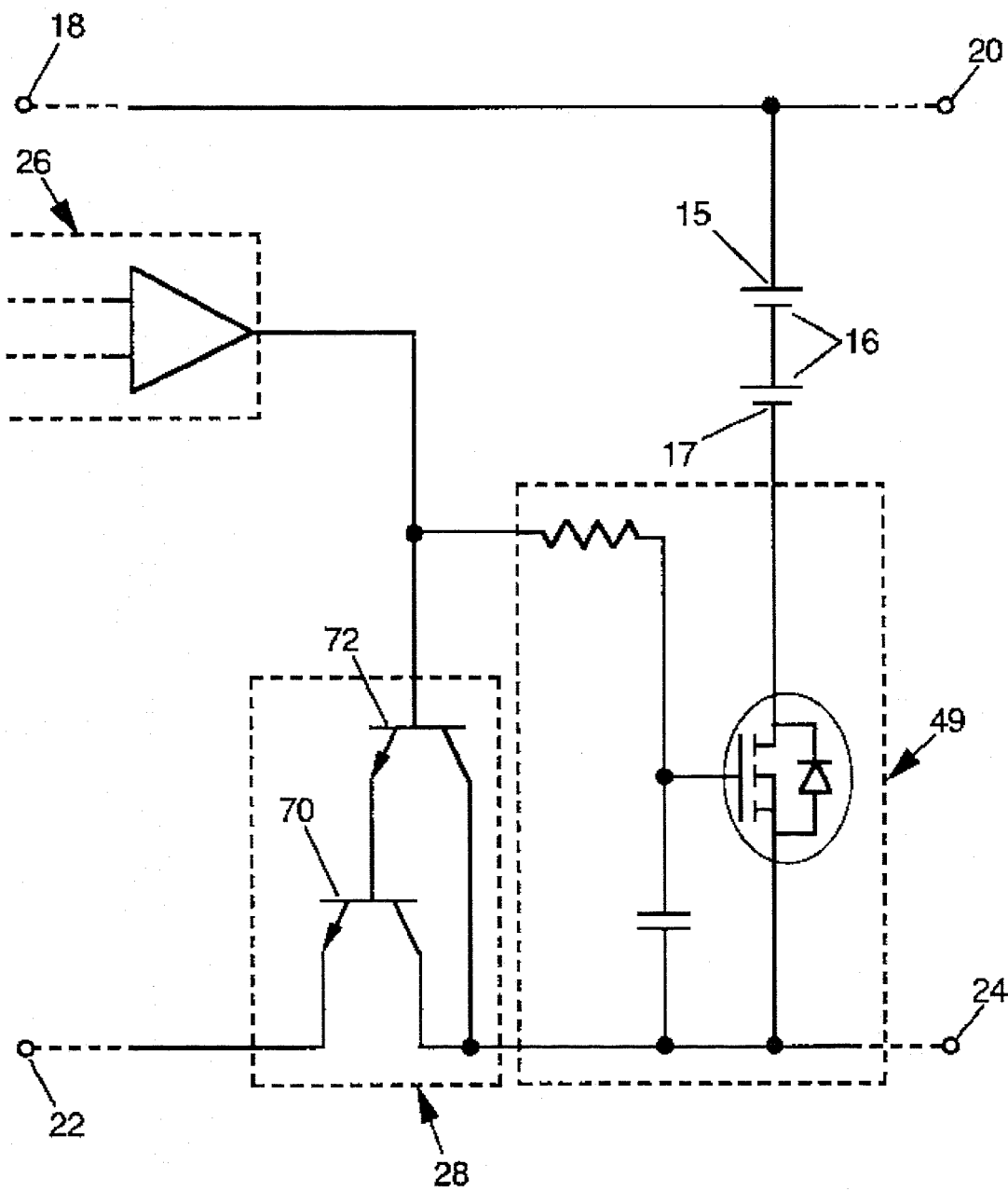
FIG. 4 is a schematic circuit diagram showing a third alternative implementation of the protection circuit.

Conversely, and as illustrated in FIGS. 3 and 4, the protection switches as shown in FIGS. 1 and 2, are electrically coupled in a low side configuration. Specifically, in FIG. 3, a MOSFET, and in particular a N-channel MOSFET 60 is electrically coupled with its source 62 and drain 68 disposed between contacts 22 and 24. The gate 66 is electrically coupled to the output of op-amp 30 in the control circuit 26, as well as to resistor 64 and safety switch 49 (when battery cells 16 are lithium ion type). Similarly in FIG. 4, the protection switch 28 is connected in a low side configuration and is at least one NPN type bipolar transistor, shown here as two, 70 and 72, in a darlington configuration as shown in FIG. 2, producing an effective transistor. In embodiments employing a low side configuration of the protection switch 28, the straddling diodes 40 and 42 used in conjunction with lithium ion cells are connected between the divider resistor 38, with their anodes forming a common node, and their cathodes straddling the protection switch 28, and resistor 36 is connected to the positive charge contact.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A rechargeable battery pack having a positive charge contact for receiving a charge current and a negative charge contact for returning said charge current, and device contacts for powering a device connected to said battery pack, wherein said battery pack is recharged through said charge contacts while powering said device through said device contacts, said battery pack comprising:

at least one battery cell, having a positive terminal and a negative terminal;

protection switch means electrically connected in series between said charge contacts and said at least one cell; and a control circuit having a comparator output for activating said protection switch means in response to a voltage at said charge contacts, wherein said control circuit comprises:

a comparator means, having an inverting input, a non-inverting input, and an output for providing a comparator operation based on the relative voltage levels of said inputs;

voltage reference means for providing a reference voltage to said non-inverting input of said comparator means; and divider means for providing a voltage proportional to the voltage of said battery pack to said inverting input of said comparator means.

2. A battery pack as in claim 1, wherein said protection switch means comprises an enhancement mode MOSFET having a source, a drain, and a gate, said source being electrically connected to said positive charge contact, said drain being electrically connected to said at least one battery cell, and said gate being electrically connected to said comparator output of said control circuit.

3. A battery pack as in claim 2, wherein said enhancement mode MOSFET is a P-channel type and is electrically connected between said charge contacts and said at least one battery cell in a high side configuration.

4. A battery pack as in claim 2, wherein said enhancement mode MOSFET is a N-channel type and is electrically connected between said charge contacts and said at least one battery cell in a low side configuration.

5. A battery pack as in claim 1, wherein said protection switch means comprises a bipolar transistor having an emitter, collector, and base; said emitter being electrically connected to said positive charge contacts, said collector being connected to said at least one battery cell, and said base being connected to said comparator output of said control circuit.

6. A battery pack as in claim 5, wherein said bipolar transistor is a PNP type and is electrically connected between said charge contacts and said at least one battery cell in a high side configuration.

7. A battery pack as in claim 5, wherein said bipolar transistor is a NPN type and is electrically connected between said charge contacts and said at least one battery cell in a low side configuration.

8. A battery pack as in claim 1, wherein said protection switch means comprises a pair of bipolar transistors arranged in a darlington configuration producing an effective transistor having an emitter, a collector, and a base said emitter being electrically connected to said positive charge contact, said collector being connected to said at least one battery cell, and said base being connected to said comparator output of said control circuit.

9. A battery pack as in claim 8, wherein said pair of bipolar transistors are of the PNP type and are electrically connected between said charge contacts and said at least one cell in a high side configuration.

10. A battery pack as in claim 8, wherein said pair of bipolar transistors are of the NPN type and are electrically connected between said charge contacts and said at least one cell in a low side configuration.

11. A battery pack as in claim 1, wherein said voltage reference means comprises:

a voltage reference connected between the non-inverting input of said comparator means and said negative terminal of said at least one battery cell; and a bias resistor for providing bias current to said voltage reference and is connected between said non-inverting input of said comparator means and a positive voltage.

12. A battery pack as in claim 1, wherein said divider means comprises:

first resistor connected between said inverting input of said comparator means and said negative terminal of said at least one cell; and second resistor connected between said inverting input of said comparator means and said positive charger contact.

13. A rechargeable battery pack, including charger contacts having a positive contact for receiving a charge current and a negative contact for returning said charge current, device contacts having a positive contact for providing a current to a device for powering said device and a negative contact for receiving current from said device wherein said battery pack is recharged through said charge contact means while powering said device through said device contact means, said battery pack comprising:

at least one lithium battery cell having a pre-determined upper threshold charging voltage;

protection switch means electrically connected in series between said charge contact means and said at least one cell;

safety switch means electrically connected in series between said at least one battery cell and said negative device contact; and control circuit means having a first comparator output connected to said safety switch means for activating said safety switch in response to the voltage of said at least one cell, and a second comparator output connected to, and for activating, said protection switch means in response to the voltage of said at least one cell.

14. A battery pack as in claim 13, wherein said protection switch means comprises an enhancement mode MOSFET having a source, a drain, and a gate, said source being electrically connected to said charge contacts, said drain being electrically connected to said at least one battery cell, and said gate being electrically connected to said second comparator output of said control circuit means.

15. A battery pack as in claim 14, wherein said enhancement mode MOSFET is a P-channel type and is electrically connected between said charge contacts and said at least one battery cell in a high side configuration.

16. A battery pack as in claim 14, wherein said enhancement mode MOSFET is a N-channel type and is connected between said charge contact means and said at least one cell in a low side configuration.

17. A battery pack as in claim 13, wherein said protection switch means comprises a bipolar transistor having an emitter, a collector, and a base; said emitter being electrically connected to said charge contact means, said collector being electrically connected to said at least one cell, and said base being electrically connected to said second comparator output of said control circuit means.

18. A battery pack as in claim 17, wherein said bipolar transistor is a PNP type and is electrically connected between said charge contacts and said at least one battery cell in a high side configuration.

19. A battery pack as in claim 17, wherein said bipolar transistor is a NPN type and is electrically connected between said charge contacts and said at least one battery cell in a low side configuration.

20. A battery pack as in claim 13, wherein said protection switch means comprises a pair of bipolar transistors arranged in a darlington configuration producing an effective transistor having an emitter, a collector, and a base, said emitter being electrically connected to said charge contact means, said collector being electrically connected to said at least one cell, and said base being electrically connected to said second comparator output of said control circuit means.

21. A battery pack as in claim 20, wherein said pair of bipolar transistors are of the PNP type and are electrically connected between said charge contacts and said at least one battery cell in a high side configuration.

22. A battery pack as in claim 20, wherein said pair of bipolar transistors are of the NPN type and are electrically connected between said charge contact means and said at least one cell in a low side configuration.

23. A battery pack as in claim 13, wherein said control circuit comprises:

a comparator means, having an inverting input, a non-inverting input, and an output for providing a comparator operation based on the relative voltage levels of said inputs, said output providing said first comparator output;

voltage reference means for providing a reference voltage to said non-inverting input of said comparator means;

divider means whereby a voltage proportional to the voltage of said battery pack is provided to said inverting input of said comparator means.

24. A battery pack as in claim 23, wherein said voltage reference means comprises:

a voltage reference connected between the non-inverting input of said comparator means and said negative contacts; and a bias resistor for providing bias current to said voltage reference and is connected between said non-inverting input of said comparator means and a positive voltage.

25. A battery pack as in claim 24, wherein said protection switch means is connected in a high side configuration, said divider means comprises:

first and second diodes, each having an anode and cathode, said first diode having its anode connected to said positive charge contact, said second diode having its anode connected to said positive terminal of said at least one cell, and said cathodes of said first and said second diodes connected to a common node;

first resistor connected between said inverting input of said comparator means and said negative terminal of said at least one cell; and a second resistor connected between said inverting input of said comparator means and said common node.

26. A battery pack as in claim 13, wherein said safety switch means comprises:

a N-channel enhancement mode MOSFET, having a gate, a drain, and a source, said drain connected to said at least one battery cell, said source connected to said negative device contact;

a capacitor connected between said gate of said N-channel enhancement mode MOSFET and said negative device contact; and a resistor connected between said gate of said N-channel enhancement mode MOSFET and said first comparator output of said control circuit.

* * * * *